(12) United States Patent
Liu

(10) Patent No.: US 12,397,696 B2
(45) Date of Patent: Aug. 26, 2025

(54) DUMP TRUCK

(71) Applicant: QINGDAO HUATIAN HAND TRUCK CO., LTD., Qingdao (CN)

(72) Inventor: Zhijun Liu, Qingdao (CN)

(73) Assignee: QINGDAO HUATIAN HAND TRUCK CO., LTD., Qingdao (CN)

( * ) Notice: Subject to any disclaimer, the term of this patent is extended or adjusted under 35 U.S.C. 154(b) by 438 days.

(21) Appl. No.: 18/104,242

(22) Filed: Jan. 31, 2023

(65) Prior Publication Data

US 2024/0198885 A1  Jun. 20, 2024

(30) Foreign Application Priority Data

Dec. 20, 2022 (CN) ......................... 202211642270.3

(51) Int. Cl.
*B60P 1/28* (2006.01)
*B62B 3/08* (2006.01)
*B62B 5/06* (2006.01)

(52) U.S. Cl.
CPC ...... *B60P 1/28* (2013.01); *B62B 3/08* (2013.01); *B62B 5/06* (2013.01)

(58) Field of Classification Search
CPC .... B60P 1/165; B60P 1/34; B60P 1/04; B60P 1/28; B60P 1/32; B60P 1/30; B60P 1/283; B61D 9/02; B62B 1/24; B62B 3/08

USPC ........................................................... 298/10
See application file for complete search history.

(56) References Cited

U.S. PATENT DOCUMENTS

| 4,270,786 A * | 6/1981 | Mattox ..................... B62B 1/24 298/3 |
| 11,904,921 B2 * | 2/2024 | Ifuku ........................ B62B 3/08 |
| 2006/0119164 A1 * | 6/2006 | Heskin ..................... B62B 3/08 298/1 C |

\* cited by examiner

*Primary Examiner* — Amy R Weisberg
*Assistant Examiner* — Philip Charles Adams
(74) *Attorney, Agent, or Firm* — Birchwood IP

(57) ABSTRACT

The present disclosure relates to a dump truck, and belongs to the technical field of means of transport. The dump truck includes a chassis frame, a truck bed and rotating frames, where first hinge points exist between the rotating frames and the chassis frame, second hinge points exist between the rotating frames and the truck bed, in a flipping and dumping process of the truck bed relative to the chassis frame, the truck bed can sequentially flip around the first hinge points and the second hinge points, in a flipping process of the truck bed, the truck bed can flip to different states by using a small force depending on dumping completeness of materials, so as to completely dump the materials, a structure is novel, and flexibility is high.

15 Claims, 10 Drawing Sheets

DUMP TRUCK

CROSS-REFERENCE TO RELATED APPLICATIONS

This application claims the benefit and priority of Chinese patent application No. 202211642270.3, filed on Dec. 20, 2022, disclosure of which is hereby incorporated by reference in its entirety.

TECHNICAL FIELD

The present disclosure belongs to the technical field of means of transport, and particularly relates to a dump truck.

BACKGROUND

A dump truck is a vehicle having a dumpable truck bed and transporting materials in a short distance. With low cost, simple maintenance, convenient operation and wide use, the dump truck is suitable for transporting sand, earthwork, coal, ore or other various bulk materials in the short distance, and is an extremely practical transport device in a daily process of carrying objects.

Most of existing dump trucks use a rotating shaft to connect a truck bed to a frame, and dump materials by means of the truck bed flipping around the rotating shaft. After the truck bed flips around the rotating shaft to an extreme position, sometimes there are some materials left in the truck. In this case, it is necessary to apply an acting force on the whole dump truck, to promote the truck bed to continue flipping by a certain angle, so as to dump all materials. A whole dumping process is tedious and labor-intensive.

SUMMARY

In view of the defects of the prior art, in order to solve the above problems, a dump truck is currently provided.

To achieve the above objective, the present disclosure provides the following technical solution:

a dump truck includes a chassis frame and a truck bed, where the dump truck further includes rotating frames, first hinge points existing between the rotating frames and the chassis frame, second hinge points existing between the rotating frames and the truck bed, and in a flipping and dumping process of the truck bed relative to the chassis frame, the truck bed being capable of subsequently flipping around the first hinge points and the second hinge points.

The further arrangement of the present disclosure is that the rotating frames have connection ends, the rotating frames are hinged to the second hinge points by means of the connection ends, and the rotating frames have free ends away from the connection ends.

The further arrangement of the present disclosure is that when the truck bed does not flip, a center of gravity of the truck bed and the second hinge points are located on two sides of the first hinge points.

The further arrangement of the present disclosure is that at the beginning of flipping of the truck bed, the truck bed is linked to the rotating frames, when the truck bed flips around the first hinge points along with the rotating frames until the rotating frames may no longer flip, the truck bed may continue flipping around the second hinge points, and when the center of gravity of the truck bed and the second hinge points are located at the same vertical line, the rotating frames may no longer flip.

The further arrangement of the present disclosure is that when the truck bed may continue flipping around the second hinge points to a plane in which a rear end of the truck bed touches dump truck wheels, the center of gravity of the truck bed and the first hinge points are located on two sides of the second hinge points respectively.

The further arrangement of the present disclosure is that after the truck bed flips to the plane in which the rear end of the truck bed touches the dump truck wheels, the free ends are stressed to push the truck bed to continue flipping around the second hinge points.

The further arrangement of the present disclosure is that the connection ends and the free ends are located on the two sides of the first hinge points respectively, and the connection ends, the free ends and the first hinge points are not located on the same straight line.

The further arrangement of the present disclosure is that the rotating frames are cambered structures, two ends of the cambered structures are the connection ends and the free ends respectively, the first hinge points are located in middles of the cambered structures, and openings of the cambered structures are towards the truck bed.

The further arrangement of the present disclosure is that resistance arms between the connection ends and the first hinge points are smaller than power arms between the free ends and the first hinge points.

The further arrangement of the present disclosure is that a connection rod is arranged on the chassis frame, and the connection rod is hinged to the rotating frames, to form the first hinge points.

The further arrangement of the present disclosure is that the dump truck further includes a connection frame, where the connection frame is located between the truck bed and the chassis frame, and the connection frame is linked to the truck bed.

The further arrangement of the present disclosure is that a rear end of the connection frame is hinged to the connection ends, to form the second hinge points.

The further arrangement of the present disclosure is that the connection frame has a width greater than that of the chassis frame, and the rotating frames have a width less than that of the chassis frame.

The further arrangement of the present disclosure is that a front end of the truck bed is provided with a female switch, and the chassis frame is provided with a male switch in locking engagement with the female switch.

The further arrangement of the present disclosure is that ends of the female switch and the male switch have clamping hooks having different orientations, so as to lock the truck bed.

The further arrangement of the present disclosure is that a rear end of the chassis frame is connected to a rear wheel by means of a rear wheel axle, a front end of the chassis frame is connected to a front frame, and the front frame is connected to a front wheel by means of a front wheel axle.

The further arrangement of the present disclosure is that the front frame is provided with a handlebar hinged to the front frame, and a tail end of the handlebar is connected to a handle.

The present disclosure has the beneficial effects:
1. The hinge points exist between the rotating frames and the chassis frame and between the rotating frames and the truck bed respectively, in a flipping process of the truck bed, the truck bed may flip to different states by using a small force depending on dumping completeness of materials, so as to completely dump the materials, a structure is novel, and flexibility is high.

2. The truck bed is hinged to the rotating frames by means of the connection frame, such that abrasion by the hinge points on the truck bed is avoided, thereby effectively prolonging service life of the truck bed.
3. The connection frame and the chassis frame both support the truck bed, thereby improving stability of the truck bed.
4. When the truck bed does not flip, the center of gravity of the truck bed and the second hinge points are located on the two sides of the first hinge points respectively, thereby improving stability of the dump truck.
5. The female switch is in locking engagement with the male switch, thereby improving stability of the truck bed in a process of material transport.

In the figures: 1—chassis frame, 2—truck bed, 3—rotating frame, 301—connection end, 302—free end, 303—resistance arm, 304—power arm, 4—first hinge point, 5—second hinge point, 6—connection frame, 601—cross beam, 602—longitudinal beam, 7—handlebar, 8—handle, 9—first connection rod, 10—second connection rod, 11—third connection rod, 12—connection shaft, 13—connection circular pipe, 14—connection rod, 15—male switch, 16—female switch, 17—pull handle, 18—switch base, 19—stop block, and 20—front frame.

DETAILED DESCRIPTION

In order to enable those skilled in the art to better understand the technical solutions of the present disclosure, the technical solutions of the present disclosure are clearly and completely described below in combination with the accompanying drawings of the present disclosure. On the basis of examples in the present application, other similar examples obtained by those of ordinary skill in the art without making creative efforts should all fall within the scope of protection of the present application. In addition, direction words mentioned in the following examples, such as "upper", "lower", "left" and "right", are only directions referring to the accompanying drawings. Therefore, the direction words used are used for explaining rather than limiting the present disclosure.

Figure 1:
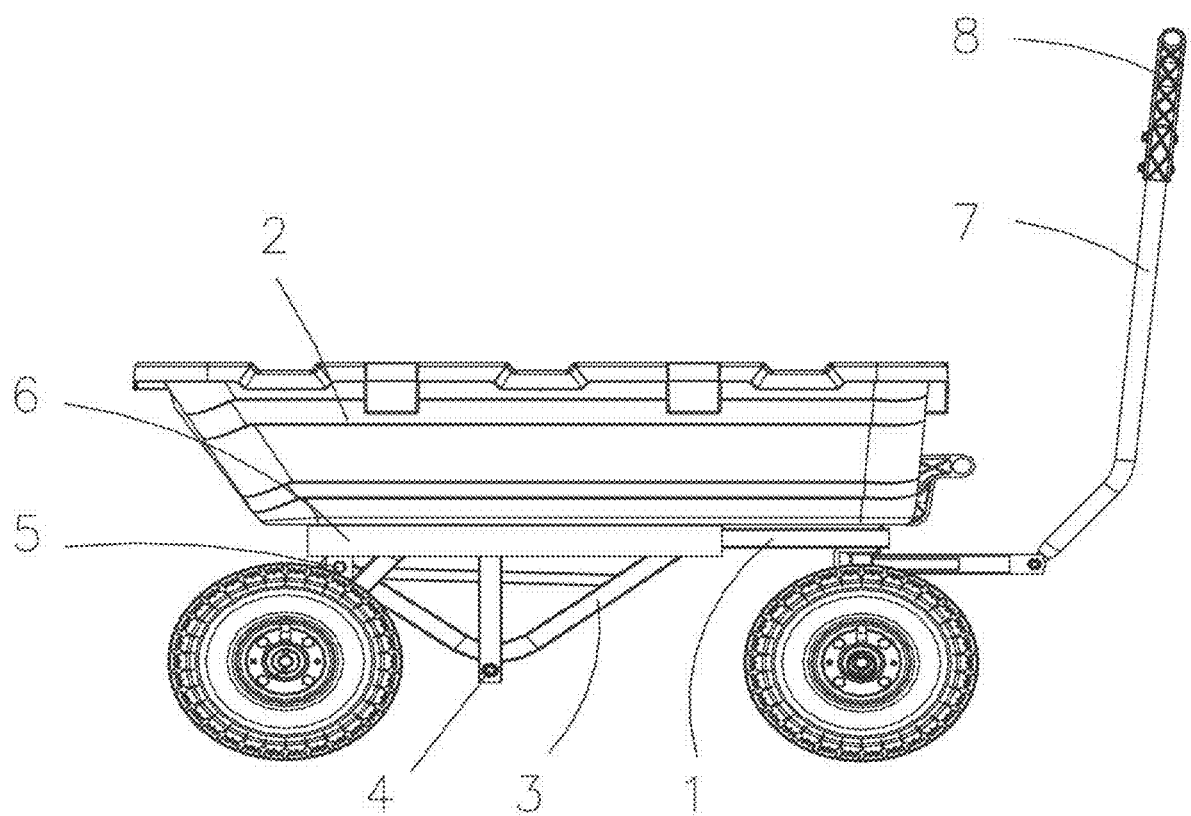
FIG. 1 is a schematic diagram of an overall structure of the present disclosure.

Example 1 as shown in FIG. 1, a dump truck includes a chassis frame 1, a truck bed 2 and rotating frames 3, first hinge points 4 existing between the rotating frames 3 and the chassis frame 1, second hinge points 5 existing between the rotating frames 3 and the truck bed 2, and in a flipping and dumping process of the truck bed 2 relative to the chassis frame 1, the truck bed 2 may subsequently flip around the first hinge points 4 and the second hinge points 5.

Specifically, the rotating frames 3 have connection ends 301, the rotating frames 3 are hinged to the second hinge points 4 by means of the connection ends, and the rotating frames 3 have free ends 302 away from the connection ends 301.

Figure 2:
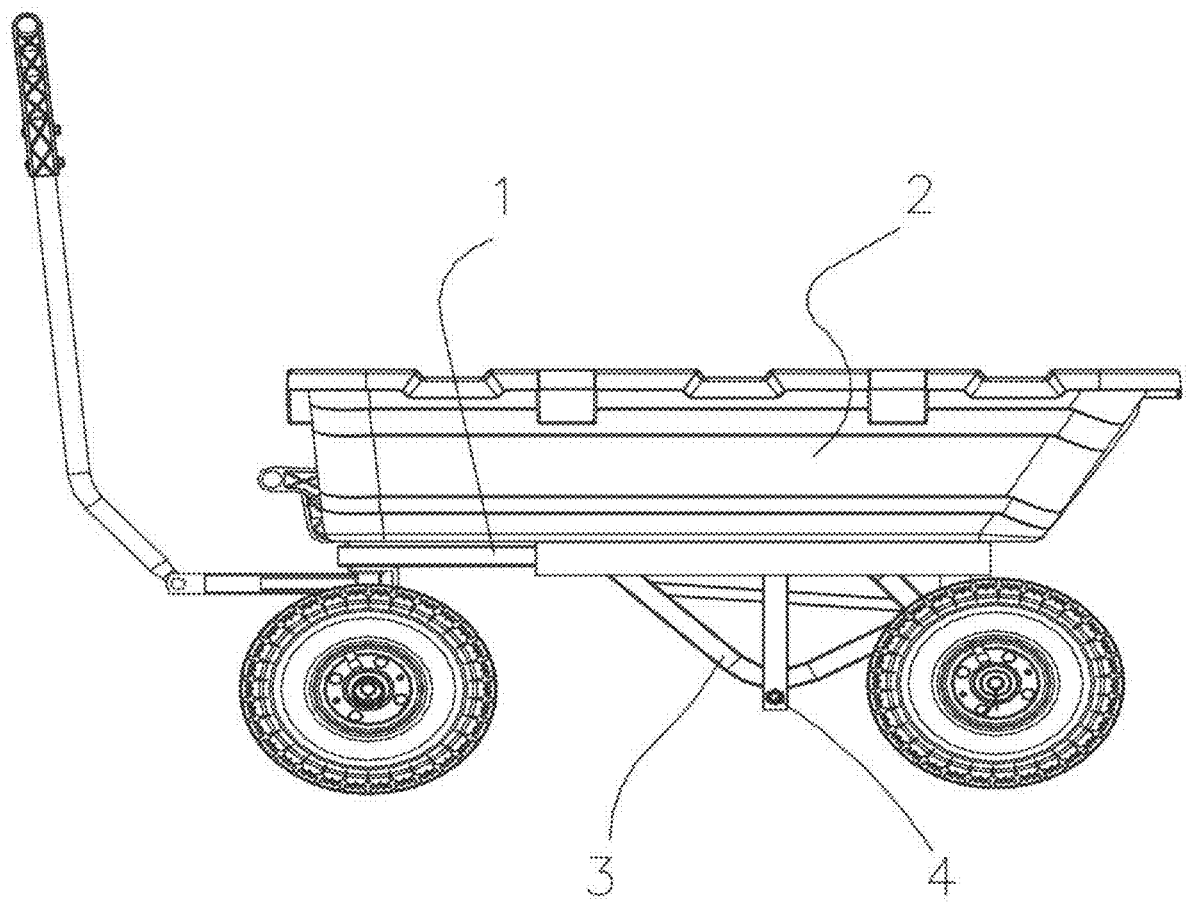
FIG. 2 is a schematic diagram of a truck bed in an un-flipped state.

As shown in FIG. 2, when the truck bed 2 does not flip, a center of gravity of the truck bed 2 and the second hinge points 5 are located on two sides of the first hinge points 4, to improve stability. It is worth noting that the truck bed 2 not flipping means that the truck bed 2 is relatively parallel to the chassis frame 1, and the free ends 302 abut against a bottom of the truck bed 2 to apply support forces to the truck bed 2.

Figure 3:
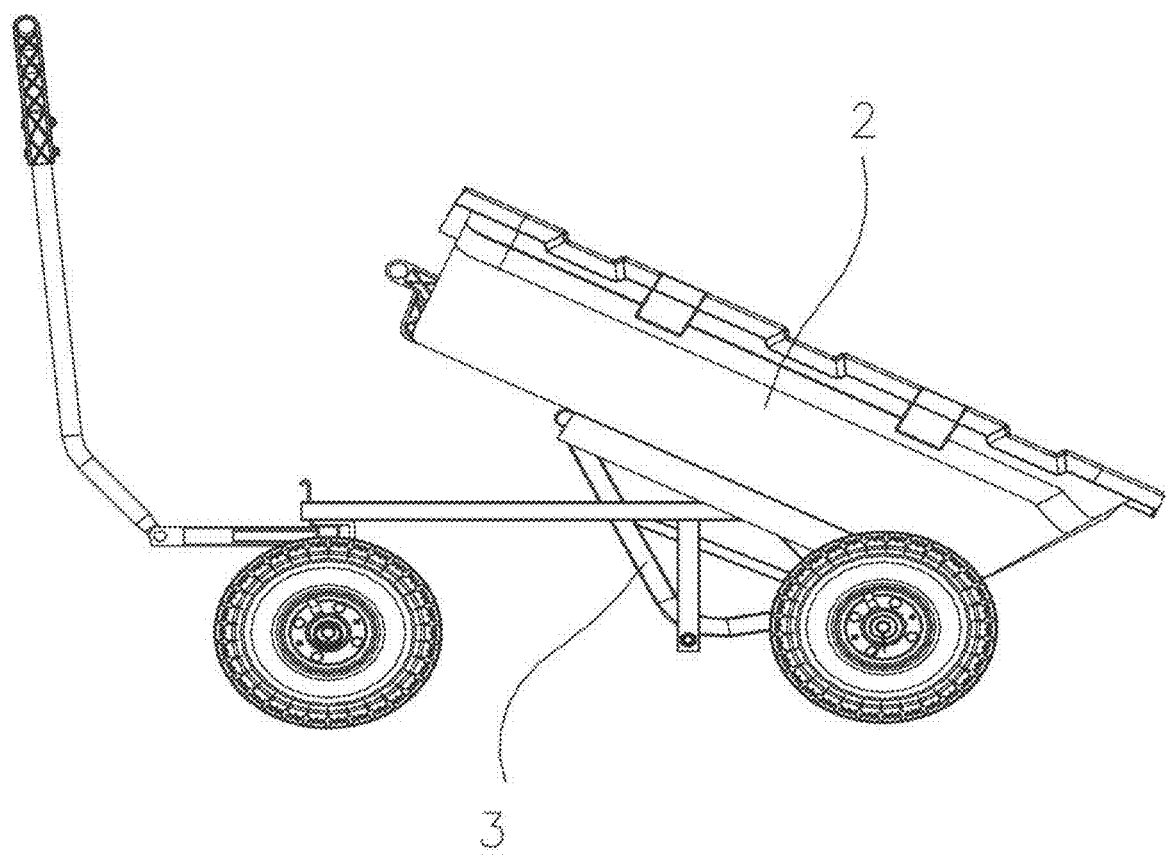
FIG. 3 is a schematic diagram of primary flipping of the truck bed.

As shown in FIG. 3, at the beginning of flipping of the truck bed 2, the truck bed 2 is linked to the rotating frames 3, and when the truck bed 2 flips around the first hinge points 4 along with the rotating frames 3 until the rotating frames 3 may no longer flip, the truck bed 2 may continue flipping around the second hinge points 5. The process is primary flipping of the truck bed 2. When the center of gravity of the truck bed 2 and the second hinge points 5 are located at the same vertical line, the rotating frames 3 may no longer flip.

It is worth noting that at the beginning of flipping of the truck bed 2, the truck bed 2 is linked to the rotating frames 3 for flipping. Under the action of gravity (including material gravity) of the truck bed 2, the truck bed 2 and the rotating frames 3 flip around the first hinge points 4, and the center of gravity of the truck bed 2 gradually moves towards the rear end of truck bed 2. When the center of gravity of the truck bed 2 and the second hinge points 5 are located in the same vertical line, the truck bed 2 and the rotating frames 3 release linkage flipping, and the rotating frames 3 do not flip, and after that, the truck bed 2 may continue flipping around the second hinge points 5. The rear end of the truck bed 2 is one end away from a handle of the dump truck.

Figure 4:
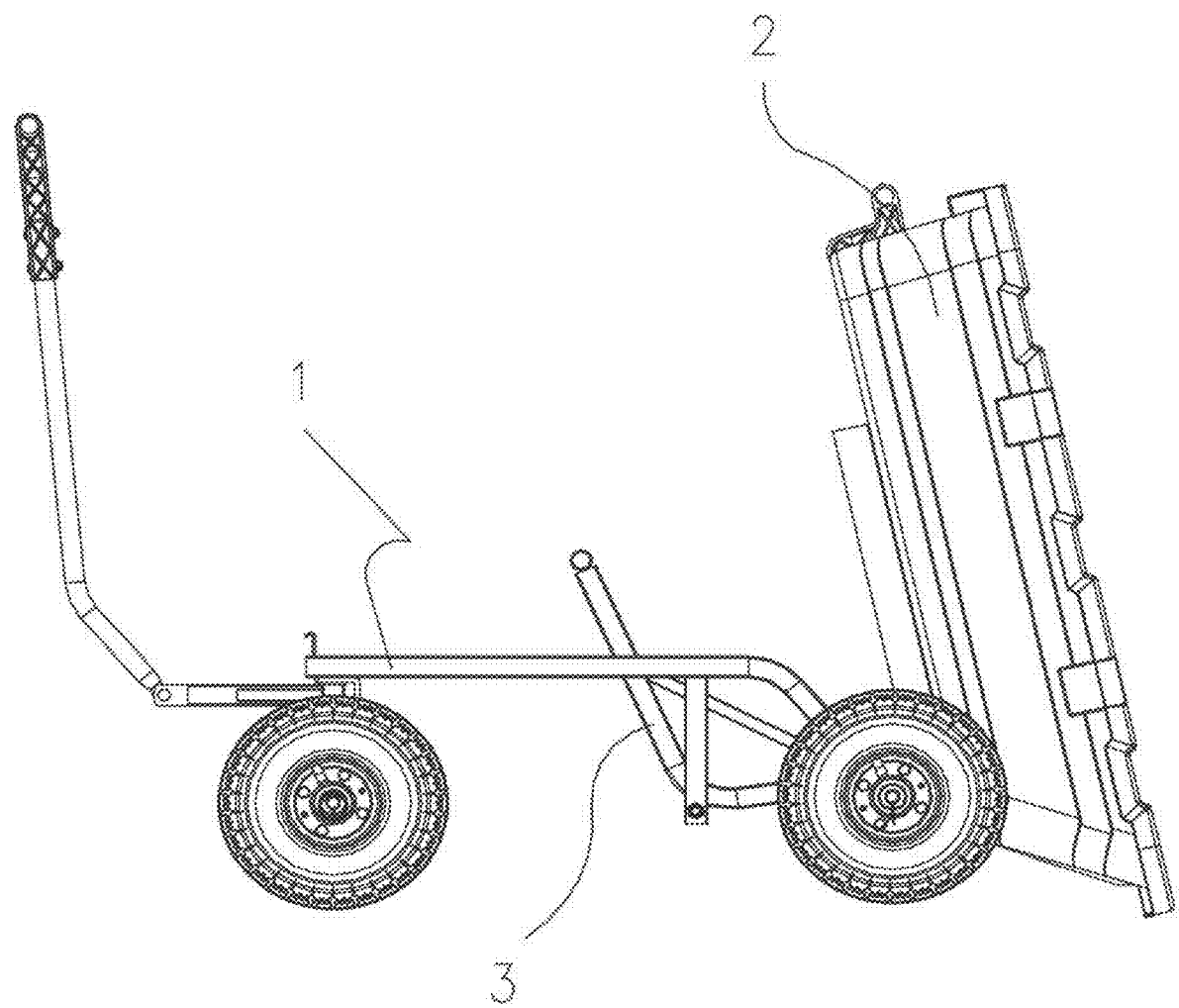
FIG. 4 is a schematic diagram of secondary flipping of the truck bed.

As shown in FIG. 4, when the truck bed 2 continues flipping around the second hinge points 5 to a plane in which a rear end of the truck bed 2 touches dump truck wheels, the center of gravity of the truck bed 2 and the first hinge points 4 are located on two sides of the second hinge points 5 respectively. The process is secondary flipping of the truck bed 2.

It is worth noting that when the truck bed 2 continues flipping around the second hinge points 5 to the plane in which the rear end of the truck bed 2 touches the dump truck wheels, a plane in which the dump truck wheels are located abuts against the rear end of the truck bed 2, to limit the truck bed 2 to continue flipping. In this case, the center of gravity of the truck bed 2 and the first hinge points 4 are located on two sides of the second hinge points 5 respectively. Specifically, the center of gravity of the truck bed 2 is located between the second hinge points 5, the rear end of the truck bed 2 and the plane in which the dump truck wheels are located.

Figure 5:
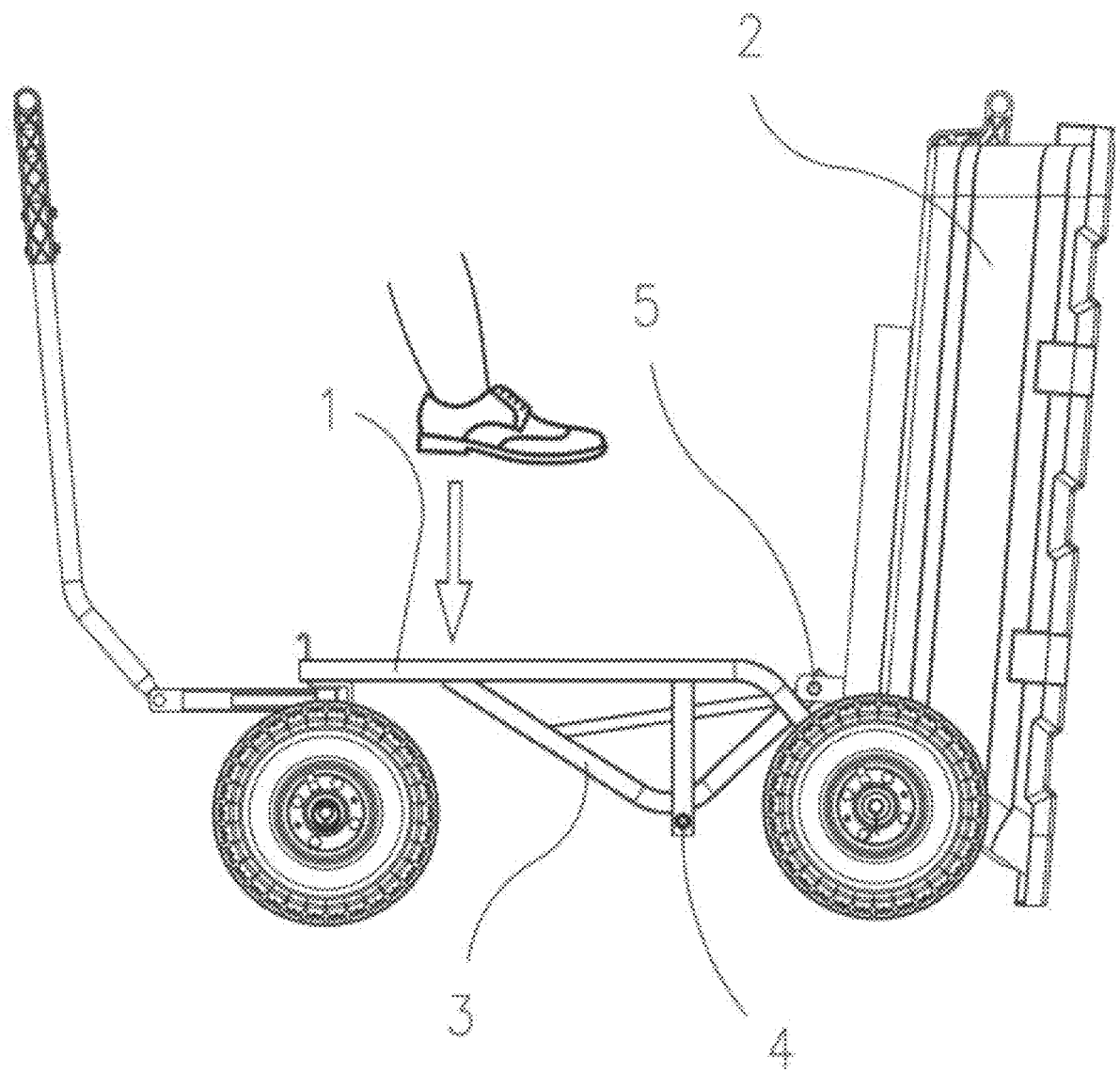
FIG. 5 is a schematic diagram of tertiary flipping of the truck bed.
Figure 6:
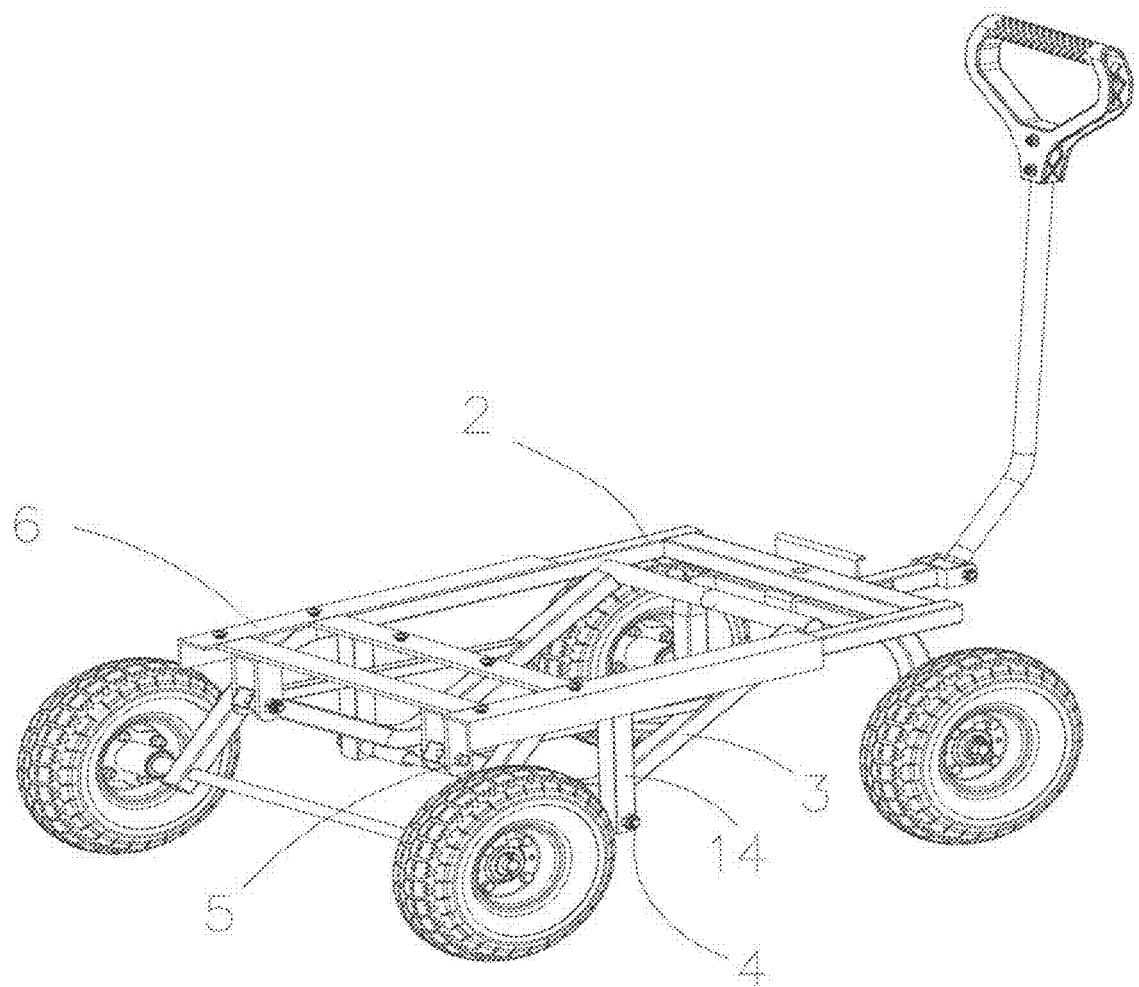
FIG. 6 is an assembly schematic diagram of a chassis frame, rotating frames and a connection frame in the present disclosure.
Figure 7:
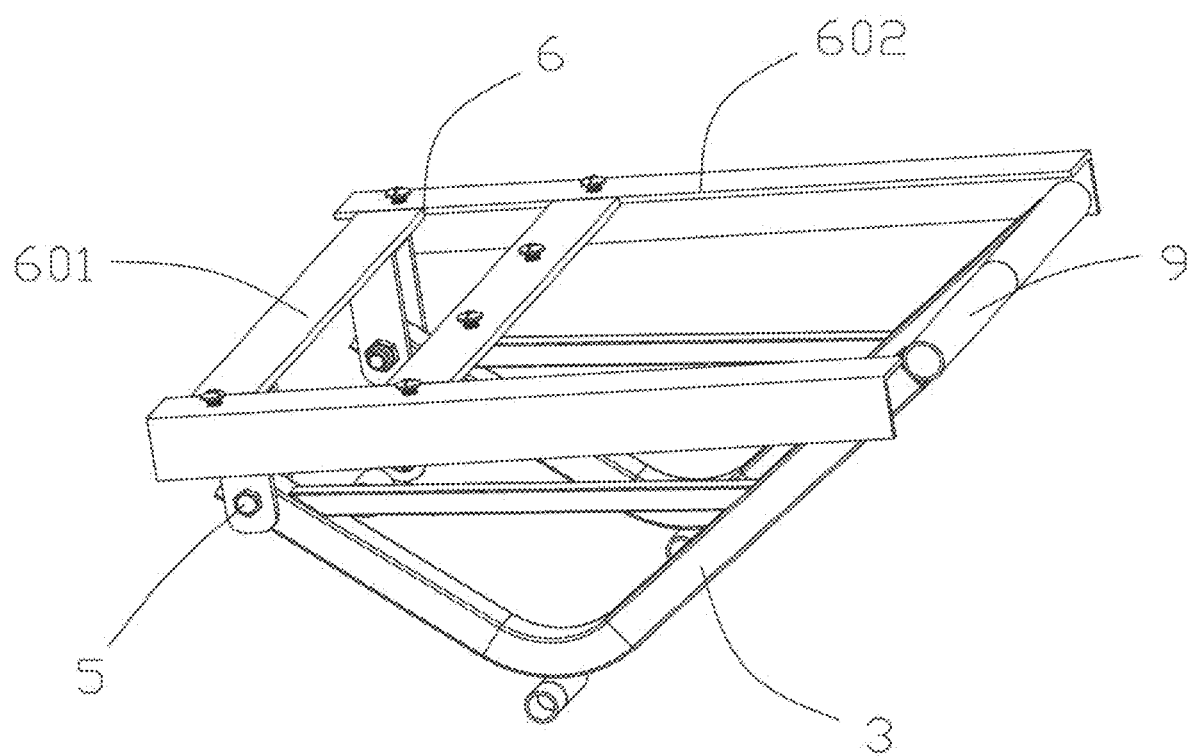
FIG. 7 is an assembly schematic diagram of the rotating frames and the connection frame in the present disclosure.
Figure 8:
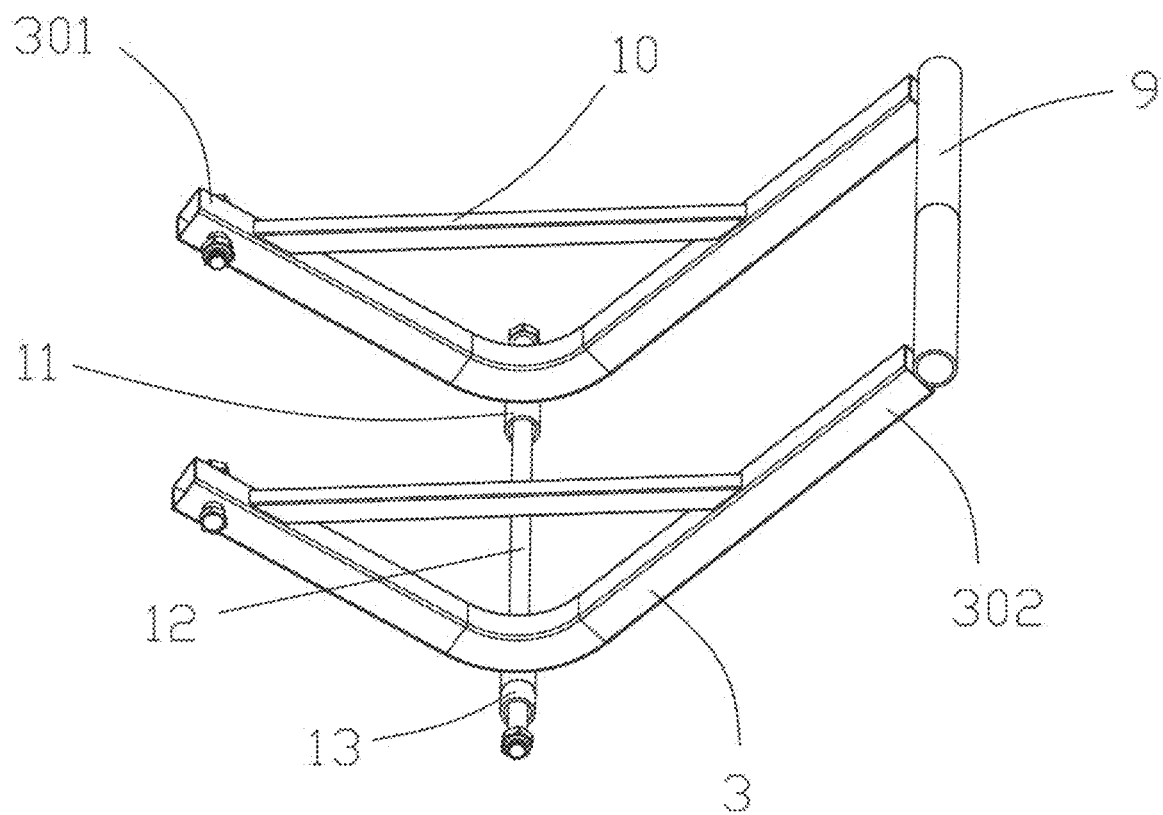
FIG. 8 is a schematic diagram of the rotating frames in the present disclosure.

As shown in FIG. 5, after the truck bed 2 flips to the plane in which the rear end of the truck bed touches the dump truck wheels, the free ends 302 are stressed to push the truck bed 2 to continue flipping around the second hinge points 5. The process is tertiary flipping of the truck bed 2.

It is worth noting that after the truck bed 2 flips to the plane in which the rear end of the truck bed touches the dump truck wheels, an operator steps on the free ends 302 (that is, an acting force is applied to the free ends 302), to promote the rotating frames 3 to reversely flip around the first hinge points 4 relative to the truck bed 2. In a reverse flipping process of the rotating frames 3, the connection ends 301 apply tensions to the truck bed 2, and pulls the truck bed 2 to continue flipping around the second hinge points 5 until the truck bed 2 is in a vertical state.

To sum up, in a flipping process of the truck bed 2, the truck bed 2 may flip to different states depending on dumping completeness of dumping, so as to completely dump the materials, and flexibility is high.

Specifically, the connection ends 301 and the free ends 302 are located on the two sides of the first hinge points 4 respectively, and the connection ends 301, the free ends 302 and the first hinge points 4 are not located on the same straight line.

As shown in FIGS. 6-8 and 10, in this example, the rotating frames 3 are cambered structures, two ends of the cambered structures are the connection ends 301 and the free ends 302 respectively, the first hinge points 4 are located in middles of the cambered structures, and openings of the cambered structures are towards the truck bed 2. It is worth noting that the connection ends 301, the free ends 302 and the first hinge points 4 form lever structures, and moreover, the connection ends 301 are connected to the second hinge points 5.

Specifically, resistance arms 303 between the connection ends 301 and the first hinge points 4 are smaller than power arms 304 between the free ends 302 and the first hinge points 4. That is to say, a small acting force is applied to the free ends 302 to push the rotating frames 3 to flip around the first hinge points 4, so as to save effort anew.

It is worth noting that the two rotating frames 3 are symmetrically arranged in a width direction of the dump truck, and the free ends of the two rotating frames 3 are connected by means of a first connection rod 9, so as to improve stability. Preferably, the first connection rod 9 is circular, so as to reduce a friction force of the first connection rod 9 on other components making contact with the first connection rod.

It is worth noting that in order to improve strength of the rotating frames 3, second connection rods 10 are arranged between the connection ends 301 and the free ends 302.

Specifically, a connection rod 14 is arranged on the chassis frame 1, and the connection rod 14 is hinged to the rotating frames 3, to form the first hinge points 4.

It is worth noting that third connection rods 11 are arranged in middles of the rotating frames 3, and the third connection rods 11 are rotatably connected to the connection rod 14 by means of a sleeve assembly.

It is worth noting that in this example, the third connection rods 11 are hollow circular pipes, and connection shafts 12 are connected between the connection rod 14 and the third connection rods 11. Specifically, the connection shafts 12 penetrate the third connection rods 11, and the connection shafts 12 are in clearance fit with the third connection rods 11. Moreover, ends of the connection shafts 12 are connected to the connection rod 14, to ensure that the rotating frames 3 may rotate relative to the chassis frame 1.

It is worth noting that the connection shafts 12 are sleeved with connection circular pipes 13 located between the third connection rods 11 and the connection rod 14, to avoid abrasion caused by direct contact between the third connection rods 11 and the connection rod 14.

It is worth noting that the connection shafts 12 penetrate the third connection rods 11 on the two rotating frames 3 at the same time, and the connection shafts 12 and the first connection rod 9 integrate the two rotating frames 3 into a whole to achieve synchronous flipping.

As shown in FIGS. 1 and 6-8, the dump truck further includes a connection frame 6, where the connection frame 6 is located between the truck bed 2 and the chassis frame 1, and the connection frame 6 is linked to the truck bed 2.

Specifically, a rear end of the connection frame 6 is hinged to the connection ends 301, to form the second hinge points 5. It is worth noting that the truck bed 2 is hinged with the rotating frames 3 by means of the connection frame 6, to avoid abrasion by the second hinge points 5 on the truck bed 2, thereby effectively prolonging service life of the truck bed 2.

In this example, the connection frame 6 has a width greater than that of the chassis frame 1, and the rotating frames 3 have a width less than that of the chassis frame 1. That is to say, the rotating frames 3 are located on an inner side of the chassis frame 1, and the connection frame 6 is located on an outer side of the chassis frame 1.

Specifically, in this example, the connection frame 6 includes cross beams 601 and longitudinal beams 602 connected to ends of the cross beams 601, where the cross beams 601 are arranged in a width direction of the chassis frame 1, the longitudinal beams 602 have right-angle longitudinal sections, one side of the right angle is located above the chassis frame 1, and the other side of the right angle is located on a side of the chassis frame 1. Preferably, the plurality of cross beams 601 are arranged in parallel to each other. The cross beams 601 and the longitudinal beams 602 are connected to the truck bed 2 by means of bolts and nuts. In addition, connection lugs are arranged on the cross beams 601, and are hinged to the connection end 301, to form the second hinge points 5.

Figure 9:
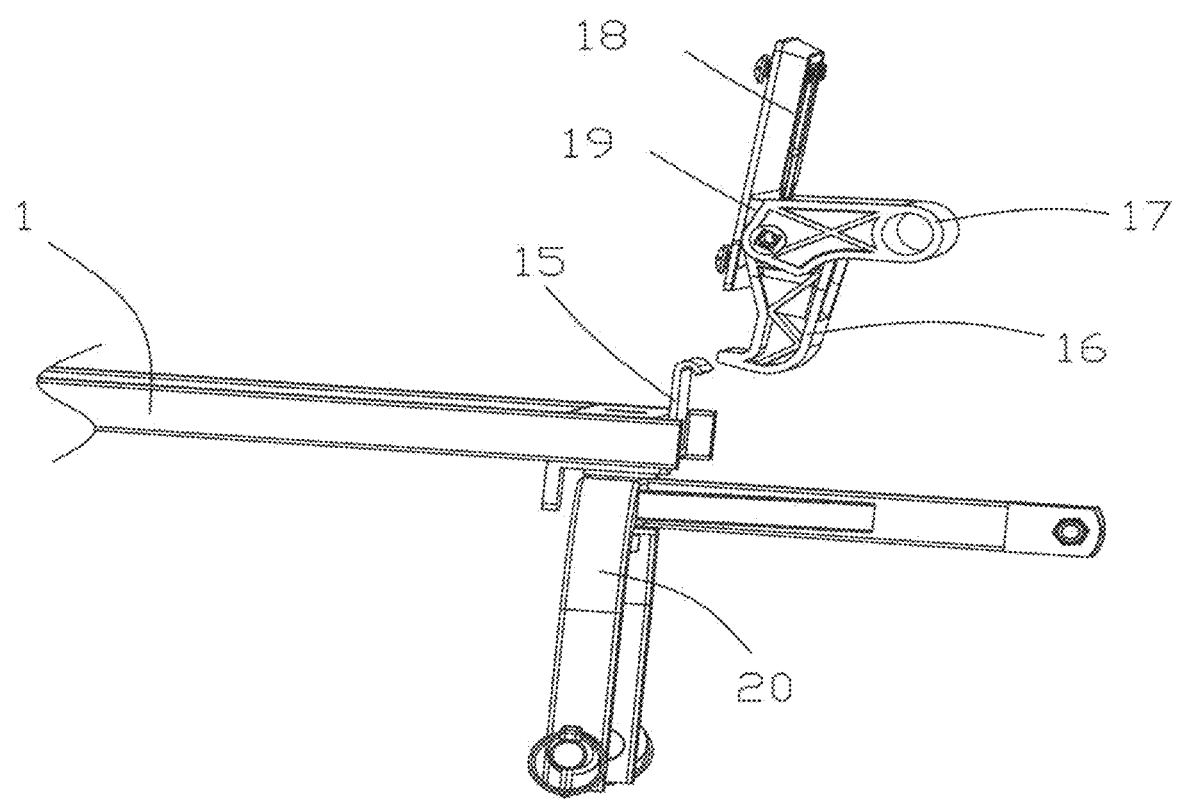
FIG. 9 is an assembly schematic diagram of a female switch and a male switch in the present disclosure.
Figure 10:
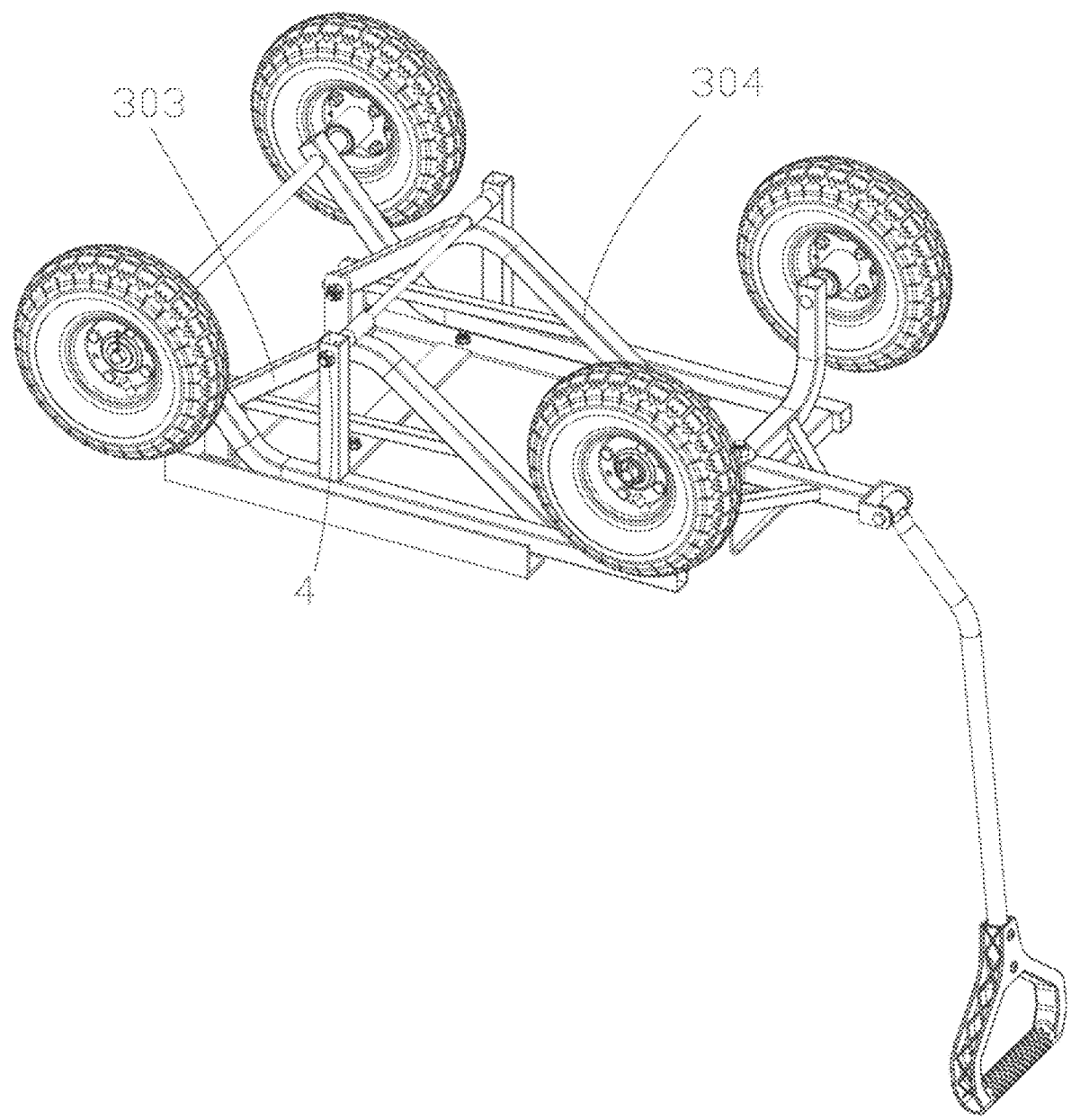
FIG. 10 is another assembly schematic diagram of a chassis frame, rotating frames and a connection frame in the present disclosure.

Specifically, as shown in FIGS. 1 and 9, a front end of the truck bed 2 is provided with a female switch 16, and the chassis frame 1 is provided with a male switch 15 in locking engagement with the female switch 16.

Preferably, the female switch 16 includes a switch plate, where the switch plate is connected to the truck bed 2 by means of a switch base 18, and the male switch 15 includes a clamping plate, where the ends of the clamping plate and the switch plate have clamping hooks having different orientations. That is to say, the truck bed 2 is locked by means of mutual clamping of the two clamping hooks.

Specifically, a pull handle 17 perpendicular to the switch plate is arranged on the switch plate, the pull handle 17 is linked to the switch plate, and moreover, the switch plate and the pull handle 17 are hinged to the switch base 18. The switch plate has a stop block 19. Preferably, the stop block 19 is a wedge block.

It is worth noting that the pull handle 17 is pressed to promote the clamping plate and the switch plate to be clamped to lock the truck bed, thereby improving stability of the truck bed 2. The pull handle 17 is lifted, such that an end of the pull handle 17 abuts against a slope of the wedge block, the clamping plate is separated from the switch plate, locking of the truck bed is released, and the truck bed 2 is lifted by using a small force to achieve flipping.

In particular, a rear end of the chassis frame 1 is connected to a rear wheel by means of a rear wheel axle, a front end of the chassis frame 1 is connected to a front frame 20, and the front frame 20 is connected to a front wheel by means of a front wheel axle. In addition, the front frame 20 is provided with a handlebar 7 hinged to the front frame, and a tail end of the handlebar 7 is connected to a handle 8. An acting force is applied to the dump truck by means of the handle 8 and the handlebar 7 to move the dump truck.

The present disclosure has been described above in detail, what is described above is merely a preferred example of the present disclosure, and is not intended to limit the scope of implementation of the present disclosure, and equivalent changes and modifications made according to the scope of the present application should all fall within the scope of the present disclosure.

What is claimed is:

1. A dump truck, comprising a chassis frame and a truck bed, wherein the dump truck further comprises rotating frames, first hinge points existing between the rotating frames and the chassis frame, second hinge points existing between the rotating frames and the truck bed, and in a flipping and dumping process of the truck bed relative to the chassis frame, the truck bed being capable of subsequently flipping around the first hinge points and the second hinge points;
   wherein the rotating frames have connection ends, the rotating frames are hinged to the second hinge points by means of the connection ends, and the rotating frames have free ends away from the connection ends;
   wherein the connection ends and the free ends are located on the two sides of the first hinge points respectively, and the connection ends, the free ends and the first hinge points are not located on the me straight line.

2. The dump truck according to claim 1, wherein when the truck bed does not flip, a center of gravity of the truck bed and the second hinge points are located on two sides of the first hinge points.

3. The dump truck according to claim 1, wherein at the beginning of flipping of the truck bed, the truck bed is linked to the rotating frames, when the truck bed flips around the first hinge points along with the rotating frames until the rotating frames can no longer flip, the truck bed can continue flipping around the second hinge points, and when the center of gravity of the truck bed and the second hinge points are located at the same vertical line, the rotating frames can no longer flip.

4. The dump truck according to claim 3, wherein when the truck bed can continue flipping around the second hinge points to a plane in which a rear end of the track bed touches dump truck wheels, the center of gravity of the truck bed and the first hinge points are located on two sides of the second hinge points respectively.

5. The dump truck according to claim 4, wherein after the truck bed flips to the plane in which the rear end of the truck bed touches the dump truck wheels, the free ends are stressed to push the truck bed to continue flipping around the second hinge points.

6. The dump truck according to claim 1, wherein the rotating frames are cambered structures, two ends of the cambered structures are the connection ends and the free ends respectively, the first hinge points are located in middles of the cambered structures, and openings of the cambered structures are towards the truck bed.

7. The dump truck according to claim 1, wherein resistance arms between the connection ends and the first hinge points are smaller than power arms between the free ends and the first hinge points.

8. The dump truck according to claim 1, wherein a connection rod is arranged on the chassis frame, and the connection rod is hinged to the rotating frames, to form the first hinge points.

9. The dump truck according to claim 1, further comprising a connection frame, wherein the connection frame is located between the truck bed and the chassis frame, and the connection frame is linked to the truck bed.

10. The dump truck according to claim 9, wherein a rear end of the connection frame is hinged to the connection ends, to form the second hinge points.

11. The dump truck according to claim 9, wherein the connection frame has a width greater than that of the chassis frame, and the rotating frames have a width less than that of the chassis frame.

12. The dump truck according to claim 1, wherein a front end of the truck bed is provided with a female switch, and the chassis frame is provided with a male switch in locking engagement with the female switch.

13. The dump truck according to claim 12, wherein ends of the female switch and the male switch have clamping hooks having different orientations.

14. The dump truck according to claim 1, wherein a rear end of the chassis frame is connected to a rear wheel by means of a rear wheel axle, a front end of the chassis frame is connected to a front frame, and the front frame is connected to a front wheel by means of a front wheel axle.

15. The dump truck according to claim 14, wherein the front frame is provided with a handlebar hinged to the front frame, and a tail end of the handlebar is connected to a handle.

* * * * *